United States Patent [19]

Biegel et al.

[11] Patent Number: 4,772,478

[45] Date of Patent: Sep. 20, 1988

[54] METHOD FOR MAKING A HASH BROWN POTATO PATTY

[75] Inventors: Constance M. Biegel, Crown Point, Ind.; Jerome D. Kessler, Algonquin; Flora Y. Lau, Lake Zurich, both of Ill.

[73] Assignee: The Quaker Oats Company, Chicago, Ill.

[21] Appl. No.: 833,965

[22] Filed: Feb. 27, 1986

[51] Int. Cl.$^4$ .............................................. A23D 6/00
[52] U.S. Cl. ............................ 426/241; 426/438; 426/512; 426/524; 426/637
[58] Field of Search ............... 426/637, 438, 808, 241, 426/272, 441, 512, 524

[56] References Cited

U.S. PATENT DOCUMENTS

| | | | |
|---|---|---|---|
| Re. 27,531 | 12/1972 | Murray et al. | 426/637 |
| 1,199,124 | 9/1916 | Snelling | 426/637 |
| 2,568,792 | 9/1951 | Cripps | 99/355 |
| 3,244,538 | 4/1966 | Kaehler | 426/438 |
| 3,346,391 | 10/1967 | Miller et al. | 99/355 |
| 3,353,962 | 11/1967 | Smith | 426/438 |
| 3,410,702 | 11/1968 | Frank | 426/272 |
| 3,424,591 | 1/1969 | Gold | 426/637 |
| 3,597,227 | 8/1971 | Murray et al. | 426/637 |
| 3,597,239 | 8/1971 | Vahlsing | 426/438 |
| 3,751,268 | 8/1973 | Van Patten et al. | 426/441 |
| 3,846,572 | 11/1974 | Nonaka et al. | 426/441 |
| 3,914,454 | 10/1975 | Takatsu et al. | 426/441 |
| 3,976,792 | 8/1976 | Triet | 426/550 |
| 3,987,210 | 10/1976 | Cremer | 426/637 |
| 4,109,024 | 8/1978 | Cremer | 426/550 |
| 4,135,004 | 1/1979 | Finkel | 426/438 |
| 4,238,517 | 12/1980 | Bosley, Jr. et al. | 426/637 |
| 4,276,314 | 6/1981 | Andersen | 426/272 |
| 4,419,375 | 12/1983 | Willard | 426/438 |

*Primary Examiner*—R. B. Penland
*Attorney, Agent, or Firm*—Daniel W. Latham

[57] ABSTRACT

A method for making a frozen hash brown potato patty which can be heated to serving temperature in a conventional pop-up type toaster by the steps of:

(a) forming a potato patty from a plurality of potato shreds and a binder material;
(b) frying the formed patty by immersion in a hot, edible oil;
(c) removing the fried patty from the edible oil;
(d) degreasing the fried patty by heating the fried patty at a temperature above its frying temperature; and
(e) freezing the degreased patty.

10 Claims, 3 Drawing Sheets

4,772,478

METHOD FOR MAKING A HASH BROWN POTATO PATTY

BACKGROUND OF THE INVENTION

Hash brown potatoes, composite products comprising a plurality of potato shreds browned in a pan, have been a traditional breakfast favorite. Unfortunately, the time required to cook the potatoes, shred the potatoes and brown the potatoes is far greater than the amount of time most people have available to cook breakfast. There is, therefore, a significant need for a more convenient version of the traditional hash brown potato; a version which retains the organoleptic qualities prized by consumers in the has brown potato made by the traditional process but which also allows the person preparing the product to do so more quickly and conveniently.

One possible approach to a convenient hash brown potato product would be to prepare hash brown potato ingredients which could be quickly assembled and fried by the consumer. For example, potato shreds for hash brown potatoes could be packaged and sold in a frozed or refrigerated state or, the potato shreds could be molded into a patty shade and sold in a frozen or refrigerated state. In either case, these products could be pan-fried by the consumer with a resulting reduction in preparation time and effort. Unfortunately, however, even the reduced amount of time and effort required to make hash brown potatoes by these methods would still be excessive for many consumers.

Another possible approach to a convenient hash brown potato product, and the approach followed in the present invention, is to provide the consumer with a potato patty which can be simply removed from its packaging and placed into a conventional pop-up type toaster, wherein it is heated to serving temperature. This approach would provide the typical consumer with an extremely convenient and quickly prepared hash brown potato product since the ubiguitious pop-up toaster can be a highly effective heating device for small food items.

Notwithstanding the attractiveness of pop-up toaster heating for hash brown potato patties, products suitable for reheating in a pop-up toaster have not achieved wide commercial distribution. A principal reason for the lack of success in making a suitable toaster hash brown product lies primarily with the fat content of hash brown potatoes. In order to provide the organoleptic effect of traditional hash brown potatoes, about 10% to 20% of edible fat must be present in the patty. These fat concentrations in the patty, however, pose a significant problem when the patty is reheated in a pop-up type toaster because fat can drip into the toaster.

In the conventional pop-up type toaster, the bread or other product to be toasted is inserted into a slot at the top of the toaster, lowered into proximity with the toaster heating elements and when the toasting cycle is completed the toasted product is discharged through the same slot at the top of the toaster. Since toasted products are inserted and removed from the top of the toaster, any crumbs or other materials which fall off of the toasted product remain in the crumb tray at the bottom of the toaster until the toaster is cleaned. Also, if the product to be toasted contains fat at the product surface, fat which drips off of the product will remain in the toaster and may present a smoke and fire hazard during subsequent toasting cycles. It is this dripping of fat into the toaster which poses a substantial difficulty in making a satisfactory toaster hash brown potato product.

Several patents have addressed the problem of making fried products which may be heated in a pop-up toaster. For example, U.S. Pat. No. 4,419,375, issued to Willard et al, discloses a method for making toaster hash brown potato patties with a reduced amount of oil drip. The reduced drip was accomplished by the use of a natural potato binder having retrograded amylose which inhibited the penetration of fat. The reduction in drip can also be important in other toaster potato products. For example, U.S. Pat. No. 4,135,004, issued to Finkel, discloses a frozen toaster French fried potato employing a high amylose ingredient which gives limited oil absorption and thereby prevents drip in a pop-up toaster. Also, U.S. Pat. No. 4,007,292, issued to Shatila et al, discloses a French fried potato product made by extruding and then frying a potato dough; a product which is said to produce no drip when placed frozen into a pop-up toaster and reheated.

A variety of other methods have been employed to reduce the fat content of fried products but their effectiveness in making frozen products which may be reheated in a pop-up toaster has not been disclosed. For example, U.S. Pat. No. 2,939,383, issued to Kanaga, discloses an apparatus employing a drum with infra-red heating tubes therein which can cook French fried potatoes (which have been partially deep fat fried) by application of infra-red heat energy, thereby producing a reduced fat product. Also, for example, U.S. Pat. No. 3,353,962, issued to Smith, discloses a method for making low fat potato chips by passing potato slices fried to 5–20% moisture through a radiant heating zone. Neither of these patents, however, disclose a frozen hash brown potato product which is suitable for use in a pop-up toaster.

It is therefore an object of the present invention to provide a hash brown potato patty which may be reheated from a frozen state to serving temperature in a conventional pop-up toaster.

It is also an object of the present invention to produce a hash brown potato patty which when placed in a frozen state into a pop-up type toaster and then heated to serving temperature will not drip substantial amounts of fat into the toaster.

It is also an object of the present invention to provide a hash brown potato patty which contains at least 10% fat, but which does not drip a substantial amount of fat when heated to serving temperature in a pop-up toaster.

It is also an object of the present invention to provide a hash brown potato patty which will not fall apart when removed from a pop-up toaster.

It is also an object of the present invention to provide a toaster hash brown potato patty which has a brown, crisp surface which compares favorably in organoleptic terms with hash brown potatoes made by the traditional pan-frying method.

SUMMARY OF THE INVENTION

These and other objects are accomplished by the method of the present invention. We have discovered that a frozen hash brown potato patty can be made which can be heated to serving temperature in a coventional pop-up type toaster with minimal fat drip by the steps of:

(a) forming a potato patty from a plurality of potato shreds and a binder material;
(b) frying the formed patty by immersion in a hot, edible oil;
(c) removing the fried patty from the edible oil;
(d) degreasing the fried patty by heating the fried patty at a temperature above its frying temperature; and
(e) freezing and packaging the degreased patty.

The resulting hash brown potato patty can have a fat content of about 13–14.5% and yet when heated to serving temperature in a pop-up type toaster, an average of only about 0.05 mg to 0.5 grams of oil drips into the toaster. The lowest drip conditions can be achieved by the use of a highly fluid, low melting point vegetable oil in the frying step although the method will provide a product with significantly reduced oil drip with other oils as well.

Although we do not wish to be bound by theories, we believe that the success of our method in making a low drip toaster hash brown potato product lies with both the highly flowable nature of the edible oil at high temperatures and the changing moisture balance in the hash brown potato patty as it is processed. When the potato patty is formed, the potato shreds and binder typically have a high moisture content in the 75–85% moisture range. During the frying step, the hot oil contacting the patty surface causes vaporization of moisture present in the patty and reduces the moisture content of the patty into about the 55% to 70% range. The portion of the potato patty near the patty surface has the greatest moisture reduction. When the patty is removed from the edible oil, a significant quantity of residual oil remains on the surface of the patty, even if (following conventional methods) excess oil is then allowed to drain from the patty at ambient temperature. In accordance with the present invention, the amount of drip upon reheating is reduced by the application of heat during a degreasing step. Therefore, following its removal from the edible oil, heat is applied to the patty. Heating the patty causes the surface temperature of the patty to increase but this increase is moderated by evaporative cooling taking place at the patty surface until the moisture content at the patty surface again undergoes a significant reduction. Once depleted of moisture, the surface temperature of the patty then rises more rapidly, causing the residual oil on the surface of the patty to become highly fluid. Gravitational forces cause some of the highly fluid oil to run off of the patty during the heating process and, after the potato patty is removed from the heat and allowed to cool, some of the remaining highly fluid oil replaces the lost moisture in the cell structure of the potato shreds. The terms "degreasing" or "degrease" in the context of the present invention therefore identifies a step in which the amount of surface fat available to drip from the potato patty during a reheating step is reduced regardless of whether the fat becomes unavailable because it is actually removed from the potato patty or whether it becomes unavailable because it becomes more closely bound with the potato patty structure.

The resulting patty (at a moisture content in the range of about 40% to 60%) is then frozen and packaged.

It is inherent that to use the frozen potato patty product of the present invention it must be heated to serving temperature before it is consumed. We have found that even though the potato patty made by the present method contains about 13% to 14.5% fat, only a very small amount of this fat runs off of the patty when it is reheated in a pop-up toaster to a temperature (at the patty's center) of about 150° F. The resulting hashbrown potato patty has a browned, crisp surface and a moist interior.

The present invention is therefore a success in spite of the expectation that such high temperatures applied at the patty surface could cause or contribute to an undesirable darkening and charring of the patty surface and that the moisture loss caused by such a heating step could produce a hash brown potato patty which was dehydrated, shriveled and unappetizing to the consumer when it was finally reheated in a pop-up toaster.

DETAILED DESCRIPTION OF THE DRAWINGS

Figure 1:
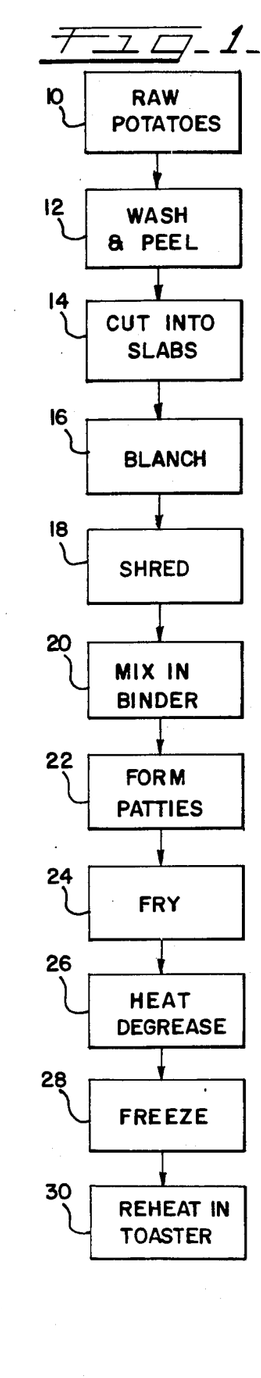
FIG. 1 is a flow chart showing the various steps employed in a preferred embodiment of the present invention.

FIG. 1 shows various steps employed in a preferred embodiment of the present invention. Generally, raw potatoes 10 are first processed by being washed and peeled 12, cut into slabs 14 about ⅜" thick, and blanched 16 by first immersing them in hot water and then immersing them in cold water. The blanched potato slabs are then shredded 18 into elongated pieces and a binder material is admixed 20 with the shreds. The mixture of binder and shreds is then formed into patties 22 by compressing the mixture in a patty mold. The formed patty is then fried 24 in hot oil for a short period of time and after the fried patty is removed from the hot oil, the patty is heat degreased 26 by heating it at a temperature above the frying temperature such that oil runs off of the patty. The degreased patty is then frozen 28 to a temperature at which it can be stored and packaged for shipment. The consumer can then use a toaster to reheat 30 the frozen patty.

Figure 2:
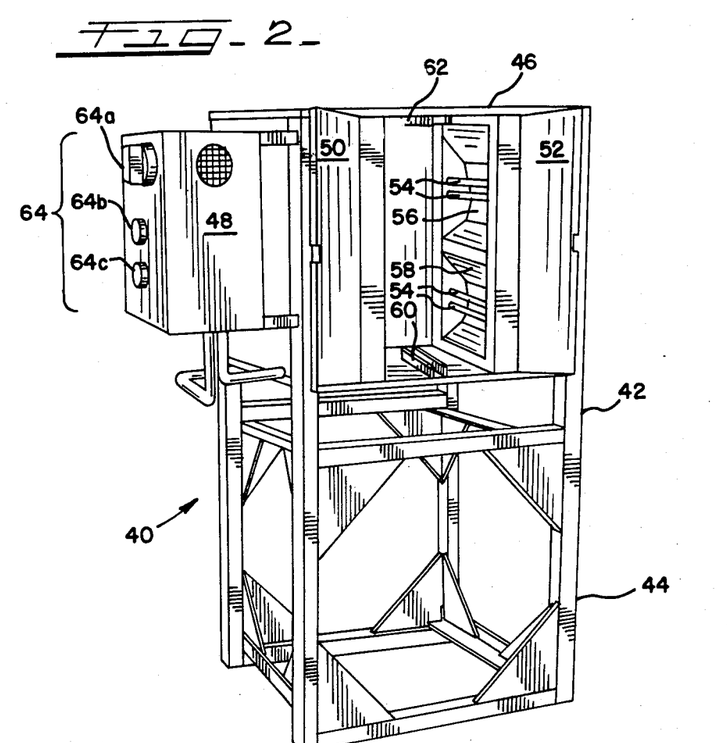
FIG. 2 is a perspective view of a heating apparatus employed in the present invention for batch heating operations, the heating apparatus being shown in the form of an enclosure with its doors open.

The apparatus drawings disclose two preferred embodiments suitable for heating the potato patties in accordance with the heat degreasing step 26 of the present invention. Referring to FIG. 2, the batch heating apparatus generally indicated by the numeral 40 has a frame 42 with a base portion 44 which supports a heating enclosure 46 and a control enclosure 48. The heating apparatus 40 is a conventional type of batch heating apparatus designed for infra-red process heating. For example, an infra-red Fostoria(TM) oven (Fostoria Industries, Inc., 1200 N. Main St., Fostoria, Ohio) could be used.

The heating enclosure 46 has hinged left and right doors 50, 52 which can be closed to minimize heat loss during the heat degreasing operation. On the interior of the heating enclosure 46 are horizontally mounted conventional quartz infra-red heating tubes 54 mounted in pairs at the right hand side of the enclosure 46. The heating enclosure 46 is bilaterally symmetrical so that it also has heating tubes (not shown) at the left side of the enclosure 46. Further, behind the heating tubes 54 are reflectors 56, 58 capable of reflecting heat from the heating tubes 54 toward the center of the enclosure 46. Also on the interior of the heating enclosure 46 and centrally attached at both bottom and top of the heating enclosure 46 are parallel rails 60, 62.

The control enclosure 48 has manual controls 64 required to control the flow of electricity to the heating tubes 54. For example, an on-off switch 64a, a voltage control 64b, and a voltage meter 64c could be used. When the controls 64 are set to activate the heating apparatus 40, the heating tubes 54 are electrically heated to a temperature at which they strongly radiate heat at infra-red wave lengths. The radiant heat given off by the portions of the tubes 54 facing the reflectors 56, 58 is reflected back toward the center of the heating enclosure 46 by the reflectors 56, 58.

Figure 3:
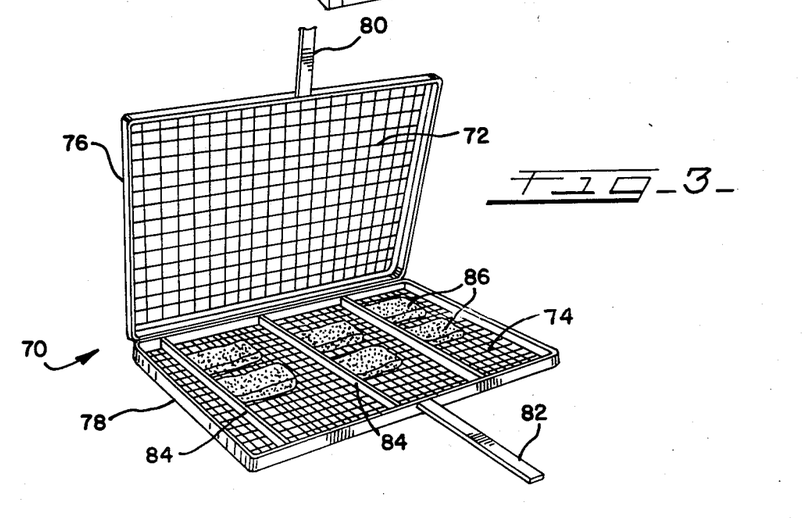
FIG. 3 is a perspective view of an open patty retaining cage with potato patties therein.

Referring now to FIG. 3, a patty retaining cage generally indicated by the numeral 70 has wire mesh elements 72, 74 attached to first and second cage frames 76, 68. The first and second cage frames 76, 78 are pivotally attached by hinges at a side opposite to handles 80, 82 which are each attached at one end to the first and second cage frames 76, 78. Cross members 84 are attached to the second cage frame 78 such that they extend across the second cage frame 78. Once potato patties 86 are placed onto the wire mesh element 74 of the second cage frame 78, the patty retaining cage 70 can be closed by pivoting the first cage frame 76 into contact with the second cage frame 78.

Figure 4:
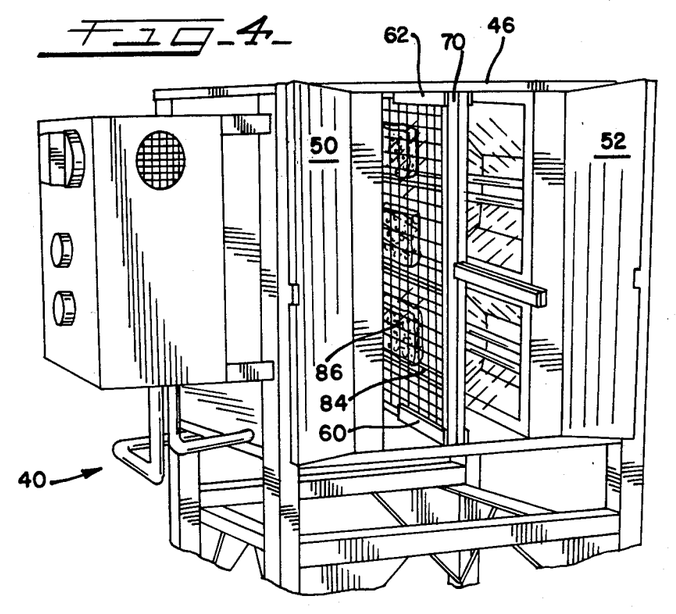
FIG. 4 is a perspective view of the upper portion of the heating apparatus of FIG. 1 with its doors open and with the closed patty retaining cage of FIG. 2 mounted in place therein.

Referring now to FIG. 4, the heating apparatus generally indicated by the numeral 40 is shown together with the patty retaining cage 70. The patty cage 70 is slideably mounted inside the heating enclosure 46 by means of the bottom and top parallel rails 60, 62. The rails 60, 62 hold the patty cage 70 in an upright, vertical orientation such that the potato patties 86 are also maintained in an upright, vertical orientation. The potato patties rest therein on the cross members 84. The left and right doors 50, 52 are shown here in the open position.

Figure 5:
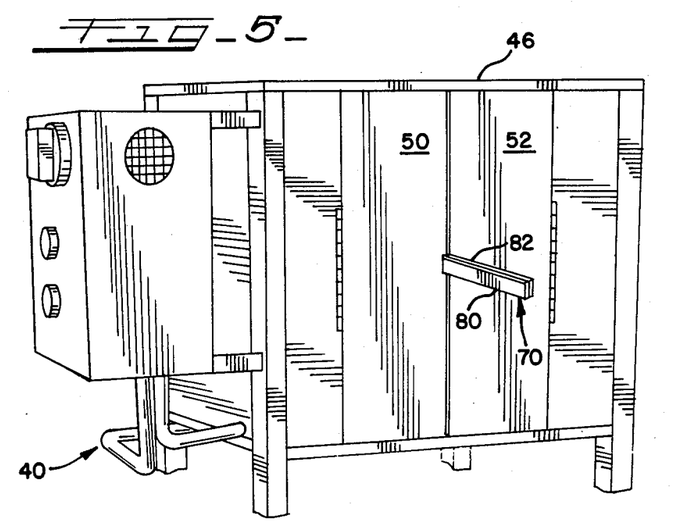
FIG. 5 is a perspective view of the upper portion of the heating apparatus of FIG. 1 and of FIG. 3 with its doors closed and with the handles of the closed patty retaining cage of FIG. 2 and of FIG. 3 projecting therefrom.

Referring now to FIG. 5, the heating apparatus and patty cage 70 are shown as they appear during batch operation of the heating apparatus. The left and right doors 50, 52 are shown to be closed to retain heat inside the heating enclosure 46 while the handles 80, 82 of the patty cage 70 remain outside of the heating enclosure 46.

Figure 6:
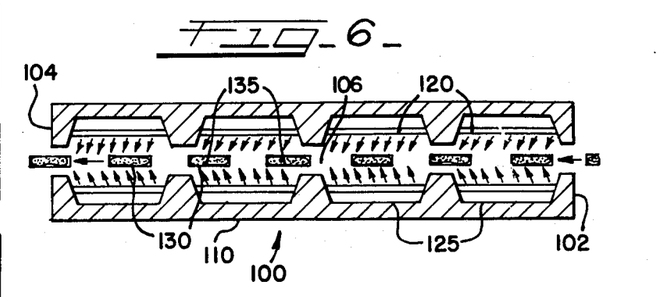
FIG. 6 is a top sectional view of a heating apparatus of the same general type shown in FIG. 1 but which is designed for continuous heating of potato patties.

Referring now to FIG. 6, a heating apparatus similar to that shown in FIG. 2 but which is designed for continuous heating of potato patties is generally indicated by the numeral 100. The heating apparatus 100 consists of a heating enclosure 110 which forms a tunnel-like structure having a first end 102, a second end 104, and an elongated passageway 106 extending between the first and second ends 102, 104. In the passageway 106 and extending parallel with the central axis of the passageway 106 are heating tubes 120 arranged to be bilaterally symmetrical to the central axis of the passageway 106. Behind the heating tubes 120 and defining (in part) the passageway 106 are reflectors 125 oriented to direct heat from the heating tubes 120 toward the center of the passageway 106. At the center of the passageway 106, patty cages 130 containing potato patties 135 are moved by a conventional conveyor (not shown) along the central axis of the passageway 106 such that when electricity is passed through the heating tubes 120, heat radiating from the heating tubes 120 is directed onto the potato patty.

Figure 7:
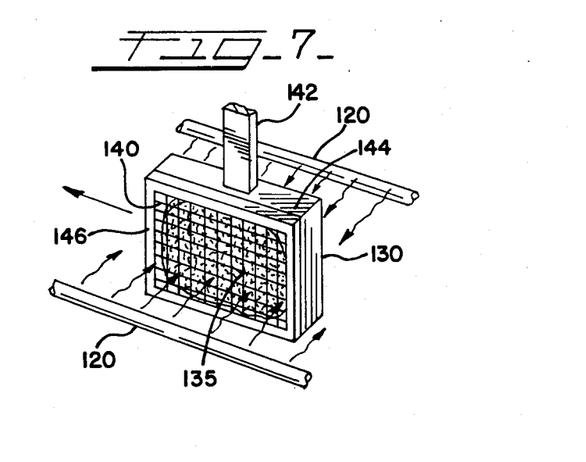
FIG. 7 is a fragmentary perspective view of the apparatus of FIG. 6 showing a patty retaining cage, a potato patty mounted therein and radiant heating tubes.

Referring now to FIG. 7, a patty cage 130 of FIG. 6 is shown with a potato patty 135 therein. The patty cage 130 has mesh sides 140 which admit radiant heat from the heating tubes 120 onto the potato patty 135. The patty cage 130 also has a handle 142 extending from a frame portion 144 of the patty cage 130 which suspends the patty cage 130 from the conveyor (not shown) and allows it to move through the apparatus. The patty cage 130 also has a door portion 146 pivotally attached to the frame portion 144 which allows the potato patty 135 to be placed into the patty cage 130 and removed from the patty cage 130.

Figure 8:
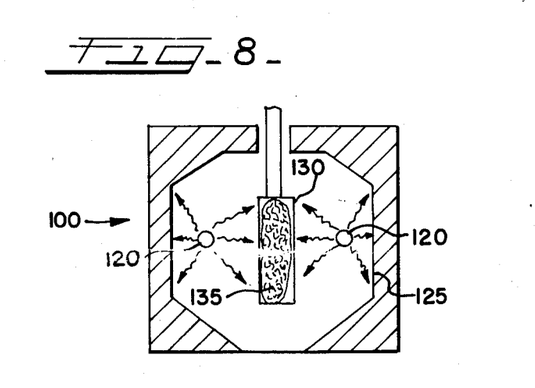
FIG. 8 is a fragmentary end sectional view of the apparatus of FIG. 6 and FIG. 7 showing a patty retaining cage, a potato patty mounted therein, and radiant heating tubes.

Referring now to FIG. 8, the heating apparatus 100 of FIG. 6 is shown in cross section with the patty cage 130 and potato patty 135 therein and also with the heating tube 120 and reflector 125 elements of the apparatus. Referring also to FIGS. 6 and 7, in operation, fried patties 135 are placed into the patty cages 130 either mechanically or by a human operator before the cages 130 are introduced into the passageway 106. A conveyor moves, carrying the patty cage 130 through the passageway 106 while the heating tubes 120 are electrically actuated to produce radiant heat. The heat from the heating tubes 120 is radiated directly onto the patty 135 and also reflected from the reflectors 125 onto the patty 135. The patty continues to be heated by radiant heat energy during the time it is in the passageway 106. The intensity of the radiant heating can be adjusted by altering the amount of electrical energy delivered to the heating tubes and the duration of heating can be adjusted by altering the conveyor speed.

DETAILED DESCRIPTION OF THE INVENTION

The method employed in the present invention generally includes the steps of forming a potato patty, frying the formed patty, removing the fried patty from the frying oil; degreasing the fried patty by application of heat and freezing and packaging the heated patty.

The potatoes employed as the principal ingredient in the present invention are raw potatoes at a moisture content of about 79% to 81% by weight which have been washed, peeled, and trimmed by conventional methods which are well known in the art, and then shredded into pieces with a width of about 1/16 inch to 3/16 inch. Preferably, the potatoes are shredded by first cutting the washed, peeled and trimmed potatoes into slabs approximately ⅜ inch to ½ inch thick. The raw slabs of potatoes are then preferably blanched or cooked by passing them through a conventional blanching/cooking process. By blanching we mean that the potato slabs are heated at a temperature and for a time required to stop enzymatic reactions in the potato. For example, a hot water bath with a temperature in the range of about 165° F. to 175° F. applied to the slabs for 6-8 minutes could adequately blanch the potato slabs. The potato slabs could also be cooked so long as the cooking process does not result in a potato texture which has a "mushy" character which prevents proper forming of the patty. For example, the potato slabs could be cooked at temperatures up to about 180° F. to 185° F. for a period of time up to about 12 minutes to 13 minutes and still produce an acceptable product. In order to produce shreds from blanched or cooked potatoes, the potato slabs are preferably cooled to stop the cooking process and to cause the starch in the potato to set. Most preferably the potato slabs should be cooled by quenching them in water to a temperature in the range of about 40° F.-45° F. The potato slabs can then be shredded into elongated pieces with a width of about 1/16 inch to 3/16 inch with a coventional shredding machine. The length of the shreds may vary considerably without affecting the formation of the patty.

In order to provide a patty with sufficient structural integrity to withstand handling during subsequent processing steps, a binder material is gently admixed with the potato shreds. The mixing could be accomplished, for example, by using a conventional mechanical mixing apparatus operated at a low speed. Binders which are suitable for use in the present invention include, for example, potato flour, potato flakes, wheat flour, rice flour and various starch products, gums, pectins and gelatin. The amount of binder to be added to the shreds is an amount which will provide the structural integrity required by the subsequent handling steps. That amount depends on the binding ability of the binder material. For example, about 2%-5% of a starch product such as Textaid A TM (by National Starch and Chemical Corporation, New York, N.Y.), 1% to 2% of a cellulose gum product such as Avicel RC-591 TM (FMC Corp., Philadelphia, Pa.) or 2% to 4% of a combination of wheat flour and Textaid A TM could be used.

During the admixing of binder material with the potato shreds, other conventional ingredients which affect, for example, the color, flavor or storage stability of the final product can also be added. For example, it is preferred that a material be added to inhibit discoloration of the product during subsequent processing steps. Sodium acid pyrophosphate (SAPP) added in an amount in the range of about 0.05% to 0.25% is one such preferred material that has been found to be successful in preventing product discoloration. These materials can, if desired, be made into a premix with the binder and then admixed with the potato shreds.

The admixture of potato shreds and binder is then formed into patty shapes. Preferably, the patty is given a shape and size which can be accommodated by a conventional pop-up toaster. One such preferred patty shape is a generally rectangular faced hexahedral shape of about 3×4×⅜ inches which provides a finished product which weighs about 50-55 grams. The patty is formed in a mold which compresses the mixture of shreds and binder such that the binder occupies the spaces between individual potato shreds and binds the individual potato shreds to each other into the patty shape defined by the mold. Both conventional roll-type and conventional reciprocating-type mechanical patty formers can be used to form the potato shreds into a patty shape. Although a smooth patty shape may be preferred in order to provide a uniform product (and since rough portions of the patty may become excessively crisp or burned during subsequent processing steps) the method is still effective with a rough patty shape in which individual potato shreds are readily observed in the final product.

The formed patty is then fried by immersion in hot edible oil. Any of the conventional frying oils or mixtures of oils may be used. For example, a tallow with a melting point of about 115° F. to 120° F., a soybean oil with a melting point of about 65° F. to 70° F., or a peanut oil with a melting point point of 35° F. to 40° F. could be used. The method employed in the present invention, however, is most effective in producing a low-drip product with an oil which has a comparatively low viscosity—below about 40 cps at 100° C.—and a melting point below about 90° F. The temperatures at which the patty can be fried are conventional and well known in the potato frying art. Generally, oil temperatures maintained in the range of about 325° F. to 400° F. can be used with temperatures in the range of about 350° F. to 380° F. being preferred. The potato patty is preferably fried for a period of time required to cook the potato patty and to reduce the moisture content of the patty into the range of about 55% to 70% by weight. Actual frying times for the potato patty will depend on the size of the patty and the temperature of the oil. Generally, a frying time of about 1 minute to 2 minutes is adequate to cook the patty and to reduce the moisture content of the patty into the preferred range. For a 3×4×⅜ inch hexahedral patty fried at an oil temperature of about 350° F. to 380° F., a frying time of about 85 seconds to 105 seconds is preferred. Conventional batch or continuous frying equipment can be used.

The fried patty is then removed from the hot oil and, in a preferred method, excess oil is allowed to drain from the patty. Also preferred is a method in which the fried patty is not allowed to cool substantially between the removal step and the subsequent heating step. Such methods are preferred because of the greater energy efficiency they provide in the degreasing steps.

The fried patty is then degreased by applying heat to the fried patty. In this heating step, the fried patty is preferrably first placed into an upright, vertical orientation, although satisfactory results may still be achieved in other patty orientations. "Upright, vertical orientation" means here that the patty is oriented such that those portions of the patty which have the greatest surface area are oriented more or less vertically to allow gravitational flow of excess oil. For example, for a 3×4×⅜ inch rectangular faced hexahedral patty, the 3×4 inch principal faces of the patty would be placed in an substantially vertical orientation which would allow excess oil to drain by gravity down the 3×4 inch faces toward the edge of the patty.

The heat may be applied by convective or radiant heating of the surface of the patty from a variety of heat sources, including gas fired equipment or electrically heated equipment, direct or indirect heating equipment. For example, ovens, convection ovens and radiant-heat type ovens could be used. Preferred heating apparatus 40 (100) heretofore described and shown in FIGS. 2, 4 and 5 (or 6, 7, and 8) employ electrical infra-red heating tubes 54 (120) which are positioned to heat the principal faces of the patty 86 (135).

With radiant or convective heating, the heat is preferably directed onto the principal faces of the patty, which have the greatest surface area. For example, for a 3×4×⅜ inch generally hexahedral patty, the heat is preferably directed onto each of the 3×4 inch faces by placing the heat source in a perpendicular orientation to the 3×4 inch faces. The heat may be directed onto each of the principal faces sequentially or simultaneously, but simultaneous heating is preferred as the most effective method. The intensity of heat directed onto the patty is that which is sufficient to cause edible oil to drip from the patty. This heat intensity is generally provided by a temperature (measured near the surface of the patty) in excess of the temperature at which the patty was fried. For example, in a preferred embodiment employing infra-red heating, a temperature sensor such as a Fisher Scientific TM LCD Digital Therometer Model 15-078-2 held near the potato patty should preferably read in the range of about 475° F. to 590° F. and most preferably in the range of about 490° F. to 575° F.

This heat degreasing of the patty is continued for a period of time required to induce oil to drip from the surface of the patty and to reduce the amount of oil drip during subsequent toaster reheating to a desired amount but not so long as to produce charring of the patty at the patty surface. Preferably the amount of oil drip permitted in the toaster during the reheating of each patty is less than or equal to about 0.5 grams. Most preferably, the amount of oil drip is less than about 0.25 grams. Generally, an amount of oil drip in the preferred range can be achieved after heating the patty for a period of about 45 seconds to 180 seconds. In a preferred embodiment of the present invention, radiant heat applied at an intensity in the range of about 490° F. to 560° F. (measured by thermometer as heretofore described) for a period of 75 to 120 seconds is sufficient to reduce the oil drip of a 3×4×⅜ inch patty into the preferred range.

The degreasing step can be undertaken either by batch or continuous processes. For example, FIGS. 2-5 show an apparatus which can be used in a batch process for carrying out the degreasing step. Also, FIGS. 6-8 show an apparatus which can be used in a continuous process for carrying out the degreasing step.

The heated patty is then frozen and packaged for shipment to the consumer. Conventional freezing equipment can be used, such as a spiral freezer. Final packaging for shipment to the consumer can be undertaken either before or after freezing the patty, however, freezing before packaging is preferred in order to minimize breakage of the patty during packaging operations.

The resulting frozen and packaged hash brown potato patty may then be shipped in a frozen state to the consumer. The consumer may then remove the frozen patty from its package and prepare it for consumption by placing the frozen patty (not allowing it to thaw) into a conventional pop-up toaster and toasting it to a temperature at the interior of the patty of about 150° F. This can be accomplished by toasting the patty for about 2 toaster cycles at a medium to dark toaster setting depending upon the heat output provided by the toaster at those settings.

Toasters other than pop-up toasters can also be used to re-heat the frozen patty including continuous toasters (toasters in which the item to be toasted is conveyed through a toasting zone by a continuous conveyor) drop-down toasters (toasters which are loaded at the top like a pop-up toaster but which discharge the toasted item at the bottom) and even the now obsolete door toaster.

Heating devices other than a toaster can also be used satisfactorily for reheating the frozen patty. For example the patty can also be prepared in an oven or toaster oven by placing it on a cookie sheet and then into a 400° F. oven or toaster oven for 10 to 12 minutes. Also, for example, the patty can be reheated in a microwave oven, preferably on a tray or the like having the capability of providing browning or crisping of foods in microwave ovens.

The following examples illustrate and explain the invention but are not to be taken as limiting the invention in any regard.

EXAMPLE 1

Peel and wash Russet Burbank potatoes and cut them into ⅜" slabs. Blanch the slabs for about 7 minutes in a water bath heated to 170° F. Remove the blanched slabs from the water bath and quench the slabs in 40° F. water. Place the slabs into a Urschel Model CC shredding machine and shred the slabs to a width of about 0.15 inches. Admix with the potato shreds in the proportions indicated a premix of the following ingredients:

National Starch Textaid A: 4%
Sodium Acid Pyrophosphate (SAAP): 0.1%

Place a portion of the admixture into a patty mold with dimensions of about 3×4×⅜ inches and compress the admixture into a patty shape. Preferably, apply a sufficiently mild amount of compression to form the patty so that the identity of shreds in the final product is preserved. Remove the patty from the patty mold and fry the patty in a bath of edible oil heated to a temperature of about 370° F. for about 90 seconds. Remove the patty from the oil bath and briefly allow excess oil to drain off from the patty. Before the patty has an opportunity to cool, place it in a heating apparatus such as that shown in FIGS. 2, 4, and 5 (or FIGS. 6, 7 and 8), the heating apparatus 40 (100) having electric infra-red heating tubes 54 (120) and heat the fried patty such that heat is directed onto both sides of the patty 86 (135) at an oven temperature (measured by thermometer near the patty surface) of about 490°–575° F. for about 60–110 seconds. Remove the radiantly heated patty from the radiant heating source and freeze it in a spiral freezer at about −15° F. for about 25–30 minutes. Package the patty for storage and shipment.

EXAMPLE 2

Four patty samples were prepared substantially as described in Example 1. Test 1 employed soybean oil as the frying oil but the test samples were not subjected to treatment by radiant heating. Test 2 also employed soybean oil as the frying oil but the test samples were subjected to radiant heating at about 550° F. for about 75 seconds. Test 3 employed tallow oil as the frying oil but the test samples were not subjected to treatment by radiant heating. Test 4 also employed tallow oil as the frying oil but the test samples were subjected to radiant heating at about 550° F. for about 75 seconds. The resulting products were placed into a Sunbeam Model 20140 pop-up toaster and toasted for two toaster cycles at its medium setting. The amount of oil drip determined in each of the tests when the test samples were reheated as well as the appearance of the samples tested is recorded in Table 1..

TABLE 1

| Test | Preparation | Toaster Drip (g.) | Appearance |
| --- | --- | --- | --- |
| 1 | No IR Treatment, Soybean Oil | 0.8 | Acceptable |
| 2 | IR Treatment to 550° F., Soybean Oil | 0.25 | Acceptable |
| 3 | No IR Treatment, Tallow oil | 4.0 | Greasy |
| 4 | IR Treatment to 550° F., Tallow oil | 0.5 | Acceptable |

EXAMPLE 3

Three tests were conducted by preparing test samples substantially as described in Example 1. The test samples were fried in a commercially available blend of 96% beef tallow and 4% soybean oil. The test samples were then radiantly heated for 75 seconds at the temperatures given in Table 2. After freezing, the test samples were then reheated to serving temperature in a toaster as described in Example 2. The amount of oil drip in each of the tests when the test samples were reheated as well as the appearance of the test samples is given in Table 2.

TABLE 2

| Test | Temperature (°F.) | Toaster Drip (g.) | Appearance |
| --- | --- | --- | --- |
| 1 | 170 | 1.3 | Greasy |
| 2 | 550 | 0.5 | Acceptable |
| 3 | 580 | 0.1 | Burned, Shriveled |

EXAMPLE 4

Three tests were conducted by preparing test samples substantially as described in Example 1. The test samples were fried in a commerically available blend of 96% beef tallow and 4% soybean oil. The test samples were then radiantly heated at 550° F. for the time periods given in Table 3. After freezing, the test samples were then reheated to serving temperature in a toaster as described in Example 2. The amount of oil drip in each of the tests when the test samples were reheated as well as the appearance of the test samples is given in Table 3.

TABLE 3

| Test | Time (sec.) | Toaster Drip (g.) | Appearance |
| --- | --- | --- | --- |
| 1 | 45 | 0.8 | Acceptable |
| 2 | 75 | 0.5 | Acceptable |
| 3 | 90 | 0.05 | Burned, Shriveled |

EXAMPLE 5

Two tests were conducted by preparing test samples substantially as described in Example 1. The test samples were fried in a commercially available blend of 96% beef tallow and 4% soybean oil. The test samples were then radiantly heated at 550° F. for 75 seconds. In test 1, each test sample was radiantly heated after being cooled to nearly room temperature. In test 2, each test sample was radiantly heated as soon as possible after it was removed from the oil bath. After freezing, the test samples were then reheated to serving temperature by placing them into a toaster as described in Example 2. The approximate surface temperature of the patties at the start of the radiant heating step, the amount of oil drip in each of the tests when the test samples were reheated and the appearance of the test samples is given in Table 4.

TABLE 4

| Test | Surface Temperature (°F.) | Toaster Drip (g.) | Appearance |
| --- | --- | --- | --- |
| 1 | 84 | 2.1 | Greasy |
| 2 | 200 | 0.5 | Acceptable |

Although the above description and examples of the invention are disclosed herein for the purpose of describing the invention to those skilled in the art, each and every modification and variation of the invention is not described in detail. It is intended, however, that all modifications and variations within the scope of the claims are to be included within the scope of the invention.

We claim:

1. In a method for making a hash brown potato product having the steps of:
   a. forming a potato patty from a plurality of potato shreds and a binder material;
   b. frying the formed patty by immersion in a hot edible oil;
   c. removing the fried patty from the edible oil;
   d. freezing the fried patty; and
   e. reheating the frozen patty to serving temperature in a pop-up toaster, the improvement consisting essentially of the step of:
   heating the fried patty before it is frozen, at an intensity and for a period of time effective to deoil the fried patty and thereby cause a reduction in oil drip from the frozen patty during the toaster reheating step.

2. The method of claim 1 wherein the fried patty is heated at an intensity which provides a temperature measured by thermometer at the surface of the patty in the range of about 475 degrees F. to about 590 degrees F.

3. The method of claim 1 wherein the fried patty is heated for a period of time in the range of about 45 seconds to 180 seconds.

4. The method of claim 1 wherein the fried patty is heated while in an upright, vertical orientation.

5. The method of claim 1 wherein the fried patty is radiantly heated.

6. The method of claim 1 also comprising the steps of: packaging the frozen patty; shipping the packaged patty in its frozen state; and removing the frozen patty from its packaging prior to reheating the frozen patty.

7. In a method for making a hash brown potato product having the steps of:
   a. forming a potato patty from a plurality of potato shreds and a binder material;
   b. frying the formed patty by immersion in a hot edible oil;
   c. removing the fried patty from the edible oil;
   d. freezing the fried patty; and
   e. reheating the frozen patty to serving temperature in a pop-up toaster, the improvement consisting essentially the step of:
   heating the fried patty before it is frozen, at an intensity which provides a temperture measured by thermometer at the surface of the patty in the range of about 475 degrees F. to about 590 degrees F. and for a period of time in the range of about 45 seconds to about 180 seconds, to deoil the fried patty and to thereby cause a reduction in oil drip from the frozen patty during the toaster reheating step.

8. The method of claim 7 wherein the fried patty is heated while in an upright, vertical orientation.

9. The method of claim 7 wherein the fried patty is radiantly heated.

10. The method of claim 7 also comprising the steps of: packaging the frozen patty; shipping the packaged patty in its frozen state; and removing the frozen patty from its packaging prior to reheating the frozen patty.

* * * * *